(12) United States Patent
Mei et al.

(10) Patent No.: US 8,282,344 B2
(45) Date of Patent: Oct. 9, 2012

(54) BALANCING GROUP FOR THE ROTOR OF A FLUID ROTARY MACHINE

(75) Inventors: Luciano Mei, Sesto Fiorentino (IT); Dino Bianchi, Florence (IT); Massimo Pinzauti, Florence (IT)

(73) Assignee: Nuovo Pignone, S.p.A., Florence (IT)

( * ) Notice: Subject to any disclaimer, the term of this patent is extended or adjusted under 35 U.S.C. 154(b) by 957 days.

(21) Appl. No.: 12/238,985

(22) Filed: Sep. 26, 2008

(65) Prior Publication Data
US 2009/0092492 A1 Apr. 9, 2009

(30) Foreign Application Priority Data
Oct. 4, 2007 (IT) .............................. MI2007A1908

(51) Int. Cl.
*F01D 25/04* (2006.01)
(52) U.S. Cl. .................. 415/119; 416/144; 74/573.1
(58) Field of Classification Search .................. 415/104, 415/105, 119; 416/144, 145; 74/573.1, 573.13, 74/570.2
See application file for complete search history.

(56) References Cited

U.S. PATENT DOCUMENTS

| | | | | |
|---|---|---|---|---|
| 4,043,147 A | * | 8/1977 | Wiebe | 464/180 |
| 4,455,887 A | * | 6/1984 | Lissajoux et al. | 74/570.1 |
| 4,667,532 A | * | 5/1987 | Holz et al. | 74/571.1 |
| 5,205,189 A | * | 4/1993 | Wesling et al. | 74/570.2 |

* cited by examiner

*Primary Examiner* — Tuan N. Quach
(74) *Attorney, Agent, or Firm* — GE Global Patent Operation

(57) ABSTRACT

A balancing group (22) is described for the rotor of a fluid rotary machine (10), wherein the rotor is of the type comprising at least one shaft (16) equipped with an internal pass-through hole (20) which develops along the longitudinal axis (A) of the shaft (16). The balancing group (22) includes at least a first inner element (24) and at least a second outer element (26), the first inner element (24) being suitable for being engaged by interference, in the direction of the longitudinal axis (A), inside the second outer element (26). The balancing group (22) thus formed is suitable for being inserted, in the direction of the longitudinal axis (A), inside the pass-through hole (20) of the shaft (16).

6 Claims, 5 Drawing Sheets

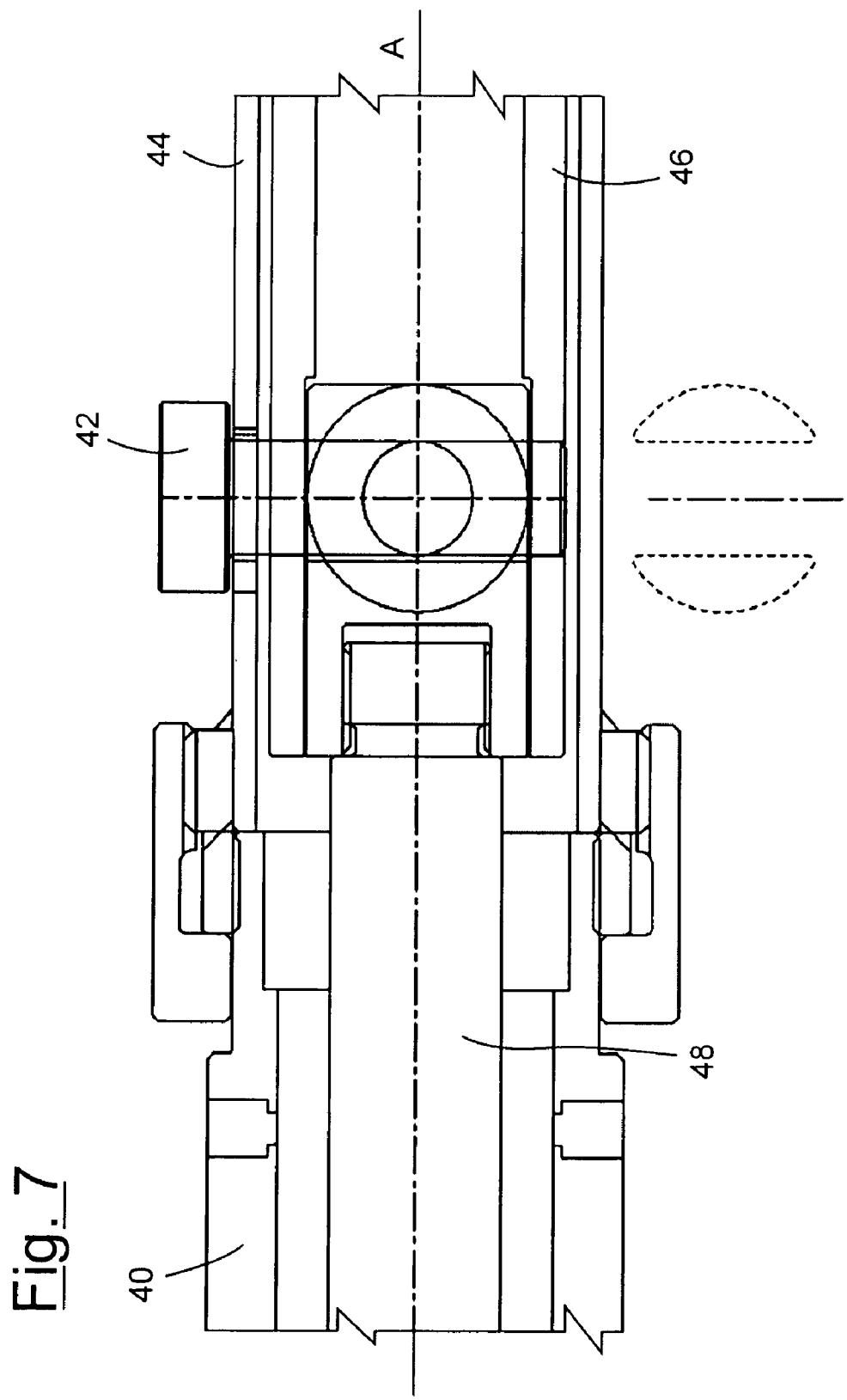

BALANCING GROUP FOR THE ROTOR OF A FLUID ROTARY MACHINE

BACKGROUND OF THE INVENTION

The present invention relates to the balancing group for the rotor or rotors of a fluid rotary machine and, more specifically, to a balancing and calibration group applicable to the rotor shaft of a fluid rotary machine.

The motors of fluid rotary machines, such as, for example, gas turbines, normally comprise a mobile rotor group rotating with respect to the casing, or stator, of the machine. The rotor group comprises a series of moving components, among which a central shaft, vane disks, sealing elements, etc. which require an accurate set-up and balancing for the machine to run correctly under all conditions of use or, in other words, under all rotation regimes allowed.

The rotors belonging to the motor of a fluid rotary machine are normally balanced in order to obtain regular functioning at low rotation regimes, by adding or subtracting pre-established masses in the areas where the rotor component allows this, without jeopardizing its functioning. Imbalances on planes different from those in which said imbalances have been revealed, must often be compensated by adding undesired torques which require compensations.

In addition, the balancing must be effected in a stable but also reversible manner, as during both the balancing phase in the workshop and during the utilization of the machine, modifications may have to be made, which cannot always be carried out on site and in a short time.

The systems currently known for the balancing of fluid rotary machines envisage the application of additional masses on different portions of the rotor itself, masses which must be removed each time, shifted and/or rotated into the most appropriate position during the subsequent set-up phases of the machine.

BRIEF DESCRIPTION OF THE INVENTION

An objective of the present invention is to solve the problems relating to the balancing systems according to the known art, by providing a balancing group for the rotor of a fluid rotary machine, which allows the rotor shaft of the machine to be balanced by positioning the balancing mass in the most suitable position for minimizing the unbalance, at the same time limiting the formation of additional torques.

Another objective of the invention is to provide a balancing group for the rotor of a fluid rotary machine, which can be easily installed in an operative position on the rotary shaft of the machine itself.

These objectives according to the present invention are achieved by providing a balancing group for the rotor of a fluid rotary machine as specified in claim 1.

Further characteristics of the invention are indicated in the subsequent claims.

BRIEF DESCRIPTION OF THE DRAWINGS

The characteristics and advantages of a balancing group for the rotor of a fluid rotary machine according to the present invention will appear more evident from the following illustrative and non-limiting description referring to the enclosed schematic drawings in which:

FIG. 7 is a further magnified view in a longitudinal section of a detail of FIG. 5.

DETAILED DESCRIPTION OF THE EMBODIMENTS OF THE INVENTION

Figure 1:
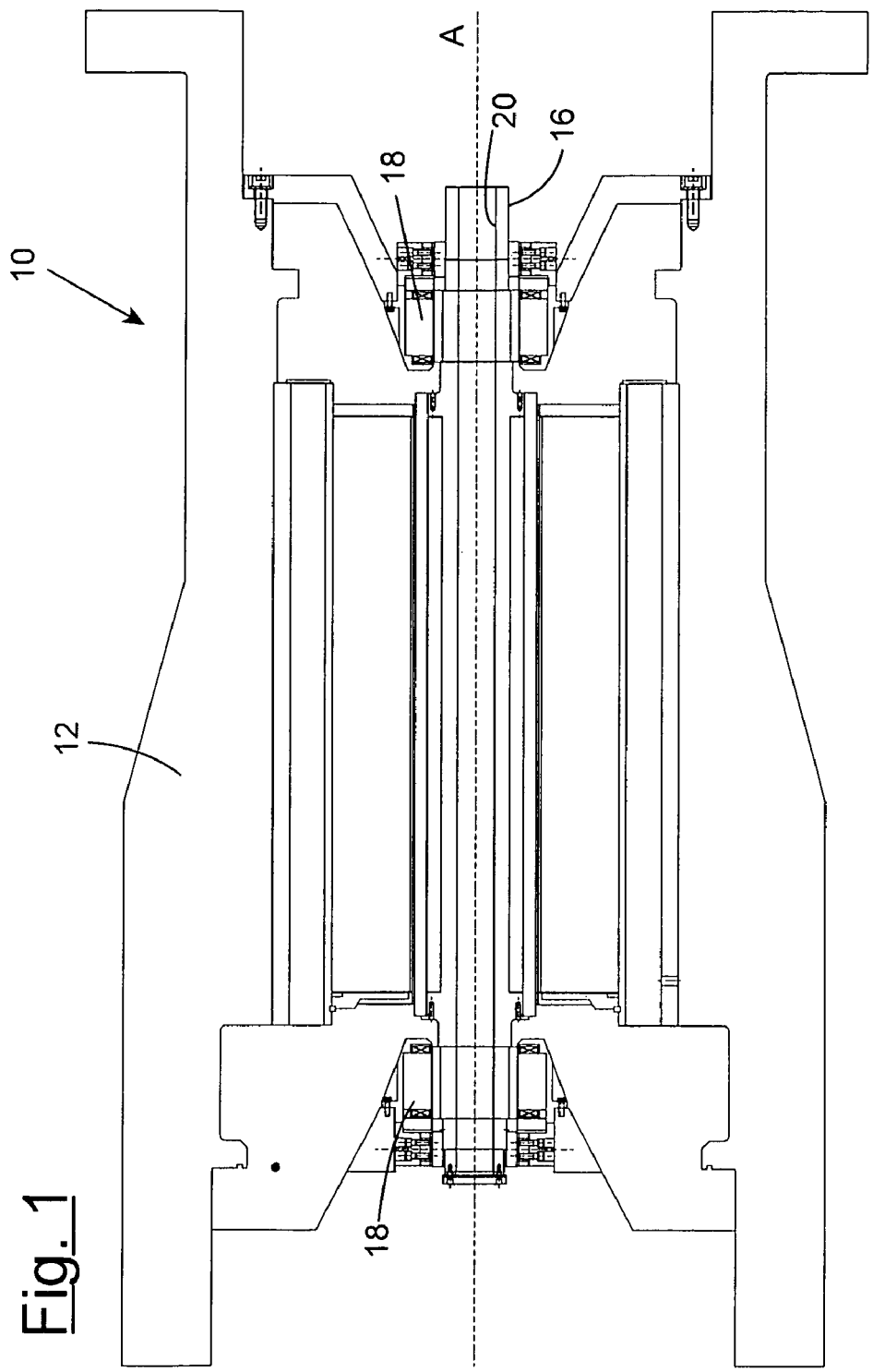
FIG. 1 is a partial schematic view, in a longitudinal section, of a fluid rotary machine, to whose rotor a balancing group according to the present invention, can be applied.

With particular reference to FIG. 1, this schematically shows in a sectional and partial view, a generic fluid rotary machine, such as, for example, an electric motor, indicated as a whole with the reference number 10.

The machine 10 comprises a casing or stator 12 in which a rotor is rotatingly assembled, of the type equipped with at least one shaft 16, resting on a series of supporting ball-bearings 18. The shaft 16 is of the hollow type, i.e. having a pass-through inner hole 20 which develops along the longitudinal axis A of the shaft 16 itself.

Figure 2:
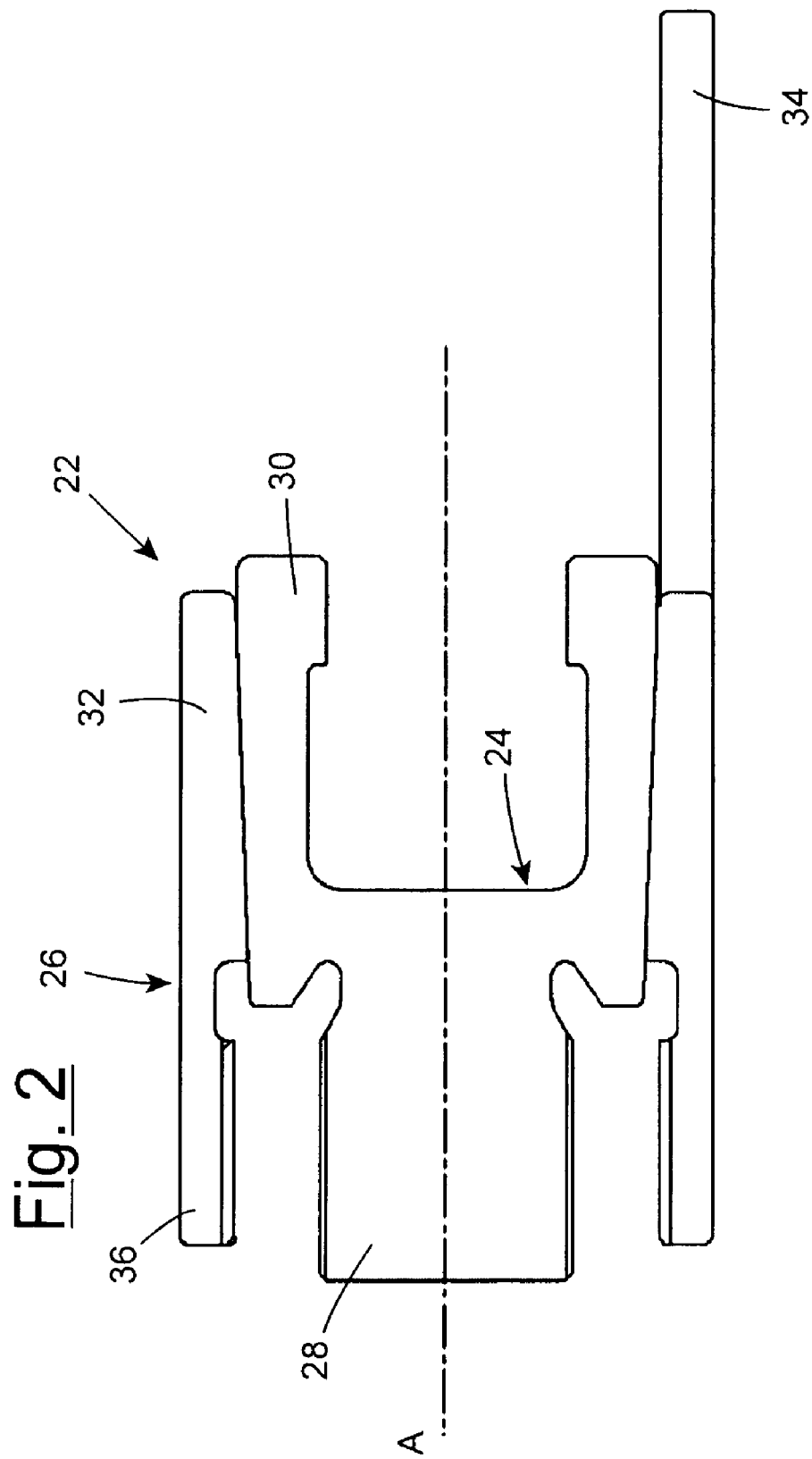
FIG. 2 is a longitudinal section view of an embodiment of the balancing group for the rotor of a fluid rotary machine according to the present invention.
Figure 3:
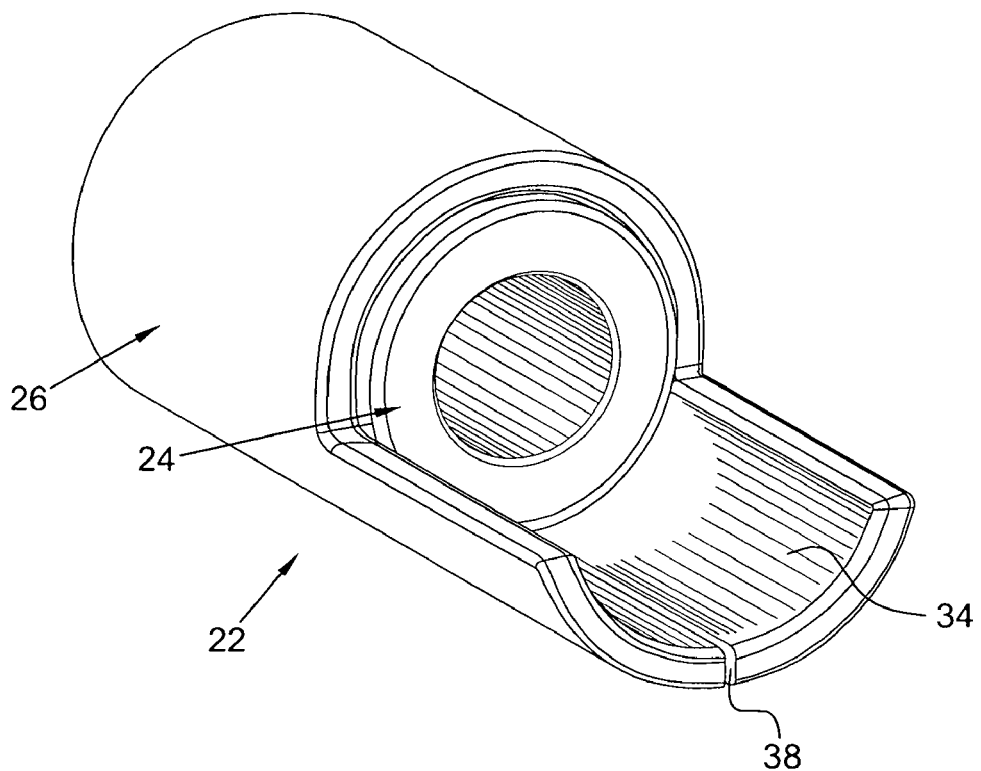
FIG. 3 is a perspective view of the balancing group shown in FIG. 1.
Figure 4:
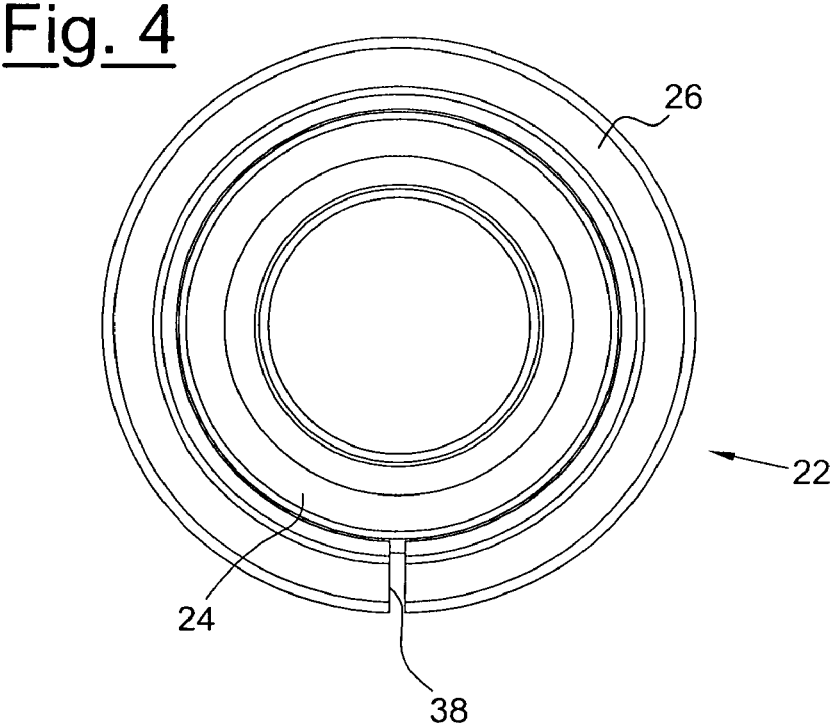
FIG. 4 is a front view of the balancing group shown in FIG. 1.

According to the invention, the balancing group for the rotor of the machine 10, shown in FIGS. 2, 3 and 4 and indicated as a whole with the reference number 22, substantially comprises two components 24 and 26 suitable for being inserted, in the direction of the longitudinal axis A, inside the pass-through hole 20 of the rotating shaft 16.

More specifically, the balancing group 22 comprises a first inner element 24, produced in the form of a conical stopper, and a second outer element 26, produced in the form of a cylindrical bush, said first inner element 24 being suitable for being engaged by interference in the direction of the longitudinal axis A, inside the second outer element 26.

The conical stopper 24 is equipped, in its rear part, with a threaded tang 28, which substantially develops along the longitudinal axis A (FIG. 2). An axial load is applied to the threaded tang 28, as better specified hereafter, suitable for inserting the conical stopper 24 inside the cylindrical bush 26 by interference coupling between a male conical portion 30 situated on the front side of the conical stopper 24, in an opposite position with respect to the tang 28, and a corresponding female conical portion 32 situated inside the front side of the cylindrical bush 26.

On the front side of the cylindrical bush 26 there is also a protruding end 34 having a semi-cylindrical hollow form (FIG. 3) which, during the rotation of the shaft 16, creates the unbalance necessary for balancing the rotor of the machine 10 in the area in which said protruding end 34 is situated. During the installation of the cylindrical bush 26, its asymmetric front portion can then be processed, by cutting for example, in order to remove the quantity of material necessary for obtaining a protruding end 34 having the desired dimensions and consequently obtaining the required imbalance.

An inner threaded portion 36 (FIG. 2)—which surrounds the tang 28, when the conical stopper 24 is inserted inside the bush 26—is situated inside the rear portion of the cylindrical bush 26.

The cylindrical bush 26 has an outer surface with a diameter smaller than the inner diameter of the hollow shaft 16, in order to allow the assembly of the shaft 16 in any axial position. In addition, the cylindrical bush 26 has a longitudinal pass-through split 38 (see FIGS. 3 and 4) which, when the axial load between the conical stopper 24 and the bush 26 itself is applied, facilitates its interference blockage on the inner surface of the pass-through hole 20 of the hollow shaft 16, due to the enlargement to which the cylindrical bush 26 is subjected.

Figure 6:
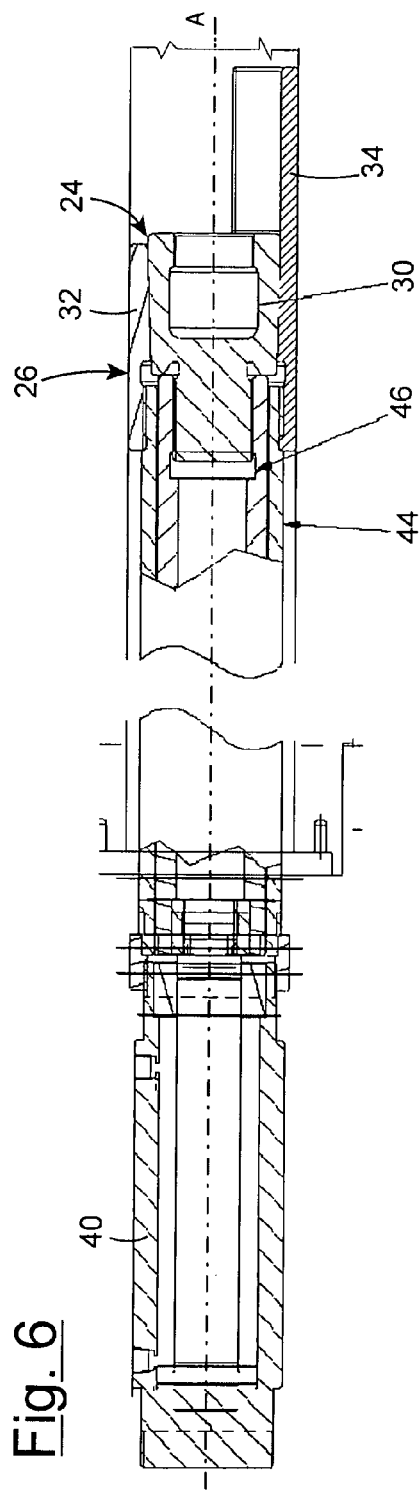
FIG. 6 is a magnified view, in a longitudinal section, of a detail of FIG. 5.
Figure 5:
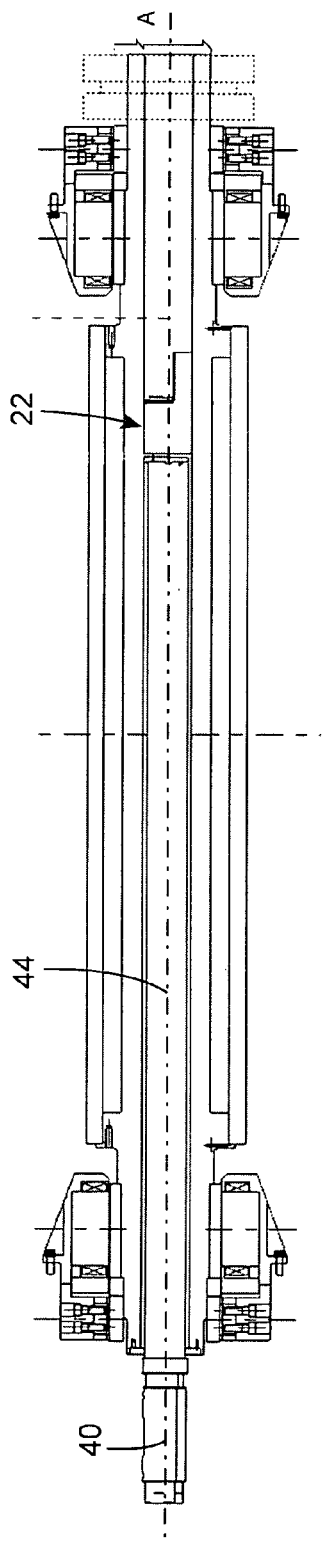
FIG. 5 is a partial longitudinal sectional view showing the application phase of the balancing group according to the present invention, on the shaft of a fluid rotary machine.

For the application of the balancing group 22 inside the hollow shaft 16, an adapting tool was prepared for a common hydraulic jack 40, of the type existing on the market (see FIGS. 5 and 6) to allow the assembly and blocking of the balancing group 22 at the desired axial distance along the hollow shaft 16. The same assembly tool, by inverting the load, is able to effect the rapid and safe disassembly of the balancing group 22, when necessary.

The assembly tool has a pass-through peg, the two external 44 and internal 46 extensions, screwed to the cylinder and to the piston 48, respectively, of the hydraulic jack 40, (see FIG. 7). The external extension 44 is formed so as to be engaged, in correspondence with its opposite end with respect to that constrained to the hydraulic jack 40, with the inner threaded portion 36 of the cylindrical bush 26. The inner extension 46 is in turn shaped so as to be engaged in correspondence with its opposite end with respect to that constrained to the cylinder 48 of the hydraulic jack 40, with the threaded tang 28 situated on the conical stopper 24. The peg 42, in addition to guaranteeing the rapid disassembly of the tool, also and primarily serves for the axial measurement of the relative movement, proportional to the interference required, of the elements 24 and 26 of the balancing group 22.

It can therefore be seen that the balancing group for the rotor of a fluid rotary machine according to the present invention achieves the objectives mentioned above, as it allows the rotor shaft to be balanced by positioning the balancing weight in the most suitable position for minimizing the imbalance, limiting the insertion of additional torques. During the running of the machine, the balancing group according to the invention, allows a diametric interference to be maintained which is such as to consider the whole unit consisting of the bush and conical stopper, as being stably fixed inside the hollow shaft.

The balancing group for the rotor of a fluid rotary machine of the present invention thus conceived can undergo numerous modifications and variations, all included in the same inventive concept; furthermore, all the details can be substituted by technically equivalent elements. In practice, the materials used, as also the forms and dimensions, can vary according to technical demands.

The protection scope of the invention is therefore defined by the enclosed claims.

The invention claimed is:

1. A balancing group for a rotor of a fluid rotary machine, wherein said rotor comprises:
    at least one shaft equipped with an internal pass-through hole which develops along the longitudinal axis of the shaft;
    at least one first inner element;
    at least one second outer element; and
    at least one protruding end connected to a front side of said second outer element, wherein said protruding end and said second outer element are a single piece;
said first inner element suitable being engaged by interference in the direction of said longitudinal axis inside said second outer element, and said balancing group suitable for insertion, in the direction of said longitudinal axis, inside the pass-through hole of said shaft.

2. The balancing group according to claim 1, wherein on a front side of said first inner element there is a male conical portion suitable for being coupled by interference with a corresponding female conical portion envisaged inside the front part of said second outer element.

3. The balancing group according to claim 1, wherein during rotation of said shaft the protruding end creates the imbalance necessary for balancing said rotor in the area in which said protruding end is situated.

4. The balancing group according to claim 1, wherein said second outer element has a longitudinal pass-through split which facilitates the blocking, by interference, of said second outer element on the inner surface of the pass-through hole of said shaft.

5. The balancing group according to claim 1, wherein said first inner element is produced in the form of a conical stopper equipped, in a rear portion, with a threaded tang which substantially develops along said longitudinal axis.

6. The balancing group according to claim 5, wherein said second outer element is produced in the form of a cylindrical bush which, inside the rear part, has an inner threaded portion surrounding said threaded tang when said conical stopper is inserted inside said cylindrical bush, said inner threaded portion and said threaded tang suitable for being engaged with means suitable for the application of said balancing group inside the pass-through hole of said shaft.

* * * * *